US006723258B1

(12) United States Patent
Schlosser

(10) Patent No.: US 6,723,258 B1
(45) Date of Patent: Apr. 20, 2004

(54) METHOD AND COMPOSITION FOR MINIMIZING RUST FORMATION AND IMPROVING PAINT ADHESION OF METAL SURFACES

(75) Inventor: Ted M. Schlosser, Tamaqua, PA (US)

(73) Assignee: Bulk Chemicals, Inc., Reading, PA (US)

( * ) Notice: Subject to any disclaimer, the term of this patent is extended or adjusted under 35 U.S.C. 154(b) by 564 days.

(21) Appl. No.: 09/607,618

(22) Filed: Jun. 30, 2000

(51) Int. Cl.$^7$ ................................................. C23F 11/10
(52) U.S. Cl. ........................ 252/389.32; 252/389.31; 106/14.15; 524/183; 524/185
(58) Field of Search ................... 252/389.31, 389.32; 524/183, 184, 185; 148/243–275

(56) References Cited

U.S. PATENT DOCUMENTS

| | | |
|---|---|---|
| 4,098,749 A | 7/1978 | Hoshino |
| 4,370,173 A | 1/1983 | Dollman |
| 4,681,814 A | 7/1987 | Leidheiser, Jr. et al. |
| 4,832,990 A * | 5/1989 | Boccalon et al. ........ 427/388.1 |
| 5,101,055 A | 3/1992 | Dinh et al. |
| 5,393,353 A | 2/1995 | Bishop |
| 5,462,727 A | 10/1995 | Engler |
| 5,547,600 A | 8/1996 | Downey |
| 5,660,890 A | 8/1997 | Rudy et al. |
| 5,747,439 A | 5/1998 | Dunn et al. |

\* cited by examiner

Primary Examiner—Matthew A. Thexton
(74) Attorney, Agent, or Firm—RatnerPrestia

(57) ABSTRACT

A method and composition for treating a metal surface, particularly steel, involves contacting the metal surface with a pretreating solution comprising a blend of water, an organo-functional silane, and a borate ester. The method involves first cleaning the metal surface, such as by using an alkaline cleaning agent, then rinsing prior to the application of the pretreating solution. The metal surface is dried and, either immediately thereafter or after some storage time, then contacted with a decorative finish, such as paint, completing the metal treatment method. The method and composition minimize rusting of the metal surface even if a relatively long period of time elapses between drying the pretreated metal surface and painting the metal surface. In addition, the method and composition provide good adhesion of the decorative finish to the metal surface. The composition may also be used in the treatment of a metal surface as a final seal for a metal which has already been pretreated, for example by an iron phosphate pretreating solution.

6 Claims, No Drawings

METHOD AND COMPOSITION FOR MINIMIZING RUST FORMATION AND IMPROVING PAINT ADHESION OF METAL SURFACES

FIELD OF THE INVENTION

The present invention pertains to pretreating metal surfaces to minimize the formation of rust and to improve the adhesion of subsequently applied decorative finishes, such as paint, to the metal surfaces.

BACKGROUND OF THE INVENTION

Minimizing the formation of rust and improving the adhesion of a decorative finish to a metal surface can be effected by pretreating the metal surface. Certain metals, such as steel, (including galvanized steel and electro galvanized steel), zinc alloys, and aluminum alloys, tend to rust in the absence of a pretreating step. Even with the application of a pretreatment, certain metals will form rust if the decorative finish (such as paint) is not applied within a few days after application of the pretreatment.

Pretreating a metal surface results in the formation of a coating or film layer over a metal surface which improves the ability of a subsequently applied decorative finish to adhere to the metal surface. Such a coating or film also decreases the reactivity of the metal surface to minimize the formation of an oxide layer (i.e., rust) over the metal surface. It is desirable, however, that the coating or film does not decease the reactivity of the metal to such an extent that the subsequently applied paint does not adhere well to the metal surface. (For convenience, paint will be identified in some places herein as the particular decorative finish to be applied, but the statements made herein referring specifically to paint can apply equally to other decorative finishes, such as lacquers.)

In general, some coating compositions serve to adequately passivate (i.e., minimize rust formation of) metal surfaces while others improve the adhesion of a subsequently applied paint or other decorative layer. One problem with known compositions, however, is that no single composition appears to form a coating on many metal surfaces (especially those metals which tend to rust easily) which functions adequately to both minimize rust formation and improve paint adhesion. In particular, steel and zinc coated steel are often not adequately passivated by many compositions.

A problem with many known compositions is that steel or zinc-coated steel must be painted very soon after the composition is applied. This is because many compositions used to passivate steel or zinc-coated steel form protective films that are hydrophobic and therefore are not readily paintable. In some cases, paint adhesion performance drops off quickly over time, and the steel or zinc coated steel must be painted within a few hours (up to about 24 hours at the most). Otherwise, the paint will not adhere well to the metal surface. For other pretreatment compositions, although paint adhesion remains adequate even if more time elapses between the application of the pretreatment and painting, the metal surface tends to rust. Depending on a number of conditions, rust can form as quickly as two days after pretreating and becomes even more problematic as more time elapses, such as between 4 to 6 days. Rust formation becomes even more likely and occurs more quickly in environments having high humidity or salt content.

The present invention is directed to a method and composition which both improves the ability of a metal surface to prevent rust formation prior to painting, while still providing good adhesion of paint to the metal surface.

SUMMARY OF THE INVENTION

To achieve these and other objectives, and in view of its purposes, the present invention provides a method and composition for pretreating a metal surface to minimize rust prevention prior to the application of the paint while still providing good paint adhesion. The pretreating composition is a blend of water, an organo-functional silane, and a borate ester. According to the method for pretreating a metal surface, a cleaned metal surface is pretreated with a pretreating composition of the present invention, then dried in preparation for application of a decorative coating to the dried metal surface.

A method for treating a metal surface according to the present invention involves first contacting the metal surface with a cleaning solution to remove soils to form a cleaned metal surface then rinsing with water. The metal surface is subsequently contacted with a pretreating solution comprising a blend of water, an organo-functional silane, and a borate ester to form a pretreated metal surface then dried. After drying, a decorative coating is applied to the dried metal surface. Using a pretreating composition according to the present invention allows for extended storage times, such as at least 8 to 12 days or more, to elapse between the pretreatment step and the painting step, with minimal or no rust forming.

The present invention also contemplates use of the composition as a final seal for a metal surface which has already been contacted with another pretreatment solution. For example, in a three stage process, a metal surface is first contacted with a combined cleaning/phosphatizing bath, rinsed, then contacted with a final rinse comprising a blend of water, an organo-functional silane, and a borate ester. Alternatively, a five stage process involves cleaning, rinsing, pretreating (such as by using an iron phosphate bath), rinsing, then applying a final seal by contacting the rinsed metal surface with a blend of water, an organo-functional silane, and a borate ester.

It is to be understood that both the foregoing general description and the following detailed description are exemplary, but are not restrictive, of the invention.

DETAILED DESCRIPTION OF THE INVENTION

The present invention pertains to a method for treating and a method and composition for pretreating metal surfaces. As used herein, the term "treating" shall include all processing of metal surfaces and include cleaning, pretreating, sealing, and applying a decorative finish to the metal surface, as well as any intermediate rinsing or drying steps. In some cases, metal surfaces are precleaned prior to the "cleaning step" referred to herein. Such precleaning typically involves mechanically abrading the metal surface, such as by sandblasting the metal surface. The term "pretreating" is directed specifically to the step in which a pretreating composition (such as a composition of the present invention or known iron phosphate pretreating compositions) is applied to the metal. The pretreating composition of the present invention serves to minimize rust formation while still allowing for good paint adhesion, even if an extended period of time such as at least eight to twelve days (or more), elapses between the pretreating step and the painting step. Even if a known pretreating composition (such as an iron phosphate bath) is used, the composition of the present invention may be applied as final seal to increase the potential storage time before painting while minimizing rust formation during this storage time. Thus, by virtue of the composition of the present invention having the ability to pretreat and to seal, it can be said that the composition of the present invention is used in the treatment of metal surfaces.

The pretreating composition of the present invention can be used to pretreat any metal surface. Preferably, the composition is used to pretreat metal surfaces which tend to rust easily, namely those forming some visible evidence of rust in a typical atmosphere after two or three days with no protective film formed thereon. Such metals are typically ferrous metals, such as steel. Other metals particularly suitable for pretreatment by the composition of the present invention include zinc and aluminum alloys, galvanized steel, and electrogalvanized steel. Also, the form of the metal to be treated can be any known form of metal, such as cold-rolled metal, extrusions, coil, or cast parts.

The treatment method is carried out in order in the following stages:

1) Clean—The metal surface is contacted with a cleaning solution to form a cleaned metal surface;
2) Water rinse;
3) Pretreatment—The metal surface is contacted with a pretreating solution which is a blend of water, an organo-functional silane, and a borate ester, to form a pretreated metal surface
4) Dry; and
5) Apply decorative finish—A decorative finish, such as paint or lacquer, is applied to the dried metal surface.

In steps 1) through 3), contacting of the various solutions with the metal surface may be accomplished by any known technique, including spray, immersion, roll coating, or flow coating techniques. The drying of step 4) is carried out in a known manner, typically by passing the pretreated metal surface through one or more ovens. Finally, the method of applying paint in step 5) is also performed according to well-known techniques, such as by spraying, rolling, or electrostatic application.

More specifically, the cleaning stage may be effected by contacting a metal surface with a cleaning solution to form the cleaned metal surface. An alkaline-based cleaner or an acidic cleaner, typically as aqueous solutions, may be used. Some exemplary alkaline cleaning agents which can be used in connection with the present invention include sodium hydroxide and potassium hydroxide. A potassium hydroxide based cleaning agent sold under the trademark BULK KLEEN™ 834HP by Bulk Chemicals of Reading, Pa., has been found to be effective, although the particular cleaning agent selected does not appear to be critical for purposes of this invention.

In addition to the cleaning agent and water, the cleaning solution may optionally also include at least one surfactant and at least one builder, which functions as an additional source of alkali and as a dispersant. Exemplary builders are soda ash, a pyrophosphate, or a tripolyphosphate. Similarly, a wide variety of surfactants may be used in the cleaning bath, such as the surfactants disclosed in U.S. Pat. No. 4,370,173 to Dollman. A sequestrant, such as sodium gluconate, may also be included to soften the water by holding calcium and magnesium. The cleaning solution cleans the metal surface by removing oil and other contaminants from the metal surface. It is known that cleaning solutions serve to remove loose impurities and surface soils from the metal surface.

The water rinse step is a conventional water rinse step, preferably using deionized or purified water. The use of deionized water avoids the introduction of any deleterious ions, such as chloride ions, into the system. Nonetheless, it has been found that tap water has been acceptable. As mentioned above, the water rinse step is carried out in a conventional manner, with a contact time and/or water flow rate in the sufficient to remove substantially all of the cleaning solution from the metal surface. Two sequential water rinse stages are preferred, with the first water rinse stage being done at an elevated temperature, such as between about 100° F. and 140° F., preferably about 120° F., and the second water rinse stage being done at about room temperature, between about 65° F. and 75° F.

After the water rinse, the rinsed metal surface is contacted with a pretreating solution comprising a blend of water, an organo-functional silane, and a borate ester to form a pretreated metal surface. As used in this application, the term "organo-functional silane" has the same meaning as the term "silane" as defined in U.S. Pat. No. 5,393,353 to Bishop, which is incorporated herein by reference. The term organo-functional silane means a silane which includes an organic group (such as an alkyl, an aryl or an alkoxy group) and a functional group which serves to bond with or assist in bonding with polymers in the pretreatment or paint. Such functional groups include, but are not limited to, amino, epoxy, vinyl, and mercapto groups. As used in the '353 patent, the following formula may be used to characterize the organo-functional silanes as used in the present invention::

$$(R^1)_a(RO)_b Si(R^2)_c \tag{I}$$

wherein each R is independently an alkyl, aryl, aryl alkyl, or a cycloalkyl group, each $R^1$ is an R group or hydrogen, $R^2$ contains from 1 to about 10 carbon atoms and one or more functional groups selected from the group consisting of halogen, vinyl, epoxy, acryl, styryl, amino, carboxyl, amide, or sulfonyl groups, a is an integer of from 0 to 3, b is an integer from 0 to 3, c is in integer from 1 to 3, and the sum of a+b+c=4. An exemplary organo-functional silane which can be used in connection with the present invention is an aminopropyltriethoxy silane sold under the trademark SILQUEST A-1100 by OSi, a Union Carbide Division, although any organo-functional silane as defined above can be used in the method of the present invention. The organo-functional silane is preferably an aminopropyltriethoxy silane, a vinyl triethoxy silane, or a Bis (gamma trimethoxysilylpropyl) amine or mixtures thereof.

The term "borate ester" as used in the present application represents an ester of boric acid, $B_2O_3$, which readily hydrolzyses to yield boric acid and the respective alcohol. For example, trimethyl borate is one such borate ester and it hydrolyzes to boric acid and methyl alcohol. The alcohol may include an additional function group, such as an amine. A wide variety of borate esters may be used, and mixtures of two or more borate esters may be used as the borate ester component. A borate ester useful for the present composition is monoethanolamine borate (MEA-borate). Monoisopropanolamine borate (MIPA-borate) alone or in combination with MEA-borate may also be used. Such borate esters are commercially available under the trade name Colacor RP from Colonial Chemical Products of South Pittsburgh, Tenn. Most preferably for steel, the borate ester is MEA borate.

The pretreating solution is made by mixing the selected organo-functional silane and borate ester with water. It is not believed that the order of mixing is important. Typically, each constituent, organo-functional silane and borate ester, is dissolved in water in a concentrated bath. The concentrated bath is diluted shortly before use. It is not known whether any particular chemical interaction occurs between the constituents. Thus, the use of the term "blend" herein is meant to include both a solution in which there is no interaction between the two constituents and a solution in which a partial or complete reaction occurs between the two constituents.

As with the cleaning bath, the various process conditions play a role in the amount of pretreatment formed as a coating on the metal surface (typically measured as coating weight in grams per square meter). These parameters include the concentration of the constituents of the pretreating solution, the treating temperature, the contact time, the acidity of the bath, the method of application of the bath, and the characteristics of the metal being coated. In general, the coating weight increases with: an increase in concentration of certain constituents of the pretreating solution (e.g., organo-functional silane and borate ester); an increase in the treating temperature; and an increase in the contact time. The selection of these parameters to achieve a given coating weight are well-known to one skilled in the art.

Some examples of ranges of these parameters are given below. Because of the interrelation of these parameters, however, it should be noted that these ranges are exemplary and a single parameter is affected by the other parameters. For example, if a higher treating temperature is used, then the contact time may be reduced in order to achieve the same coating weight for a process using a lower treating temperature and a longer contact time. In sum, the application process parameters should be set in a way such that a coating of a desired weight and of adequate quality and uniformity is applied to the metal surface.

For example, the application of the pretreating solution can be carried out at a wide range of temperatures. The temperature of the bath may range from about room temperature or may be elevated, such as between about 140° F. to 160° F., although there is no reason to believe that temperatures outside of this range will prevent the composition from having the desirable effects. Generally, a slight change in the temperature will not necessitate substantial alteration of the treating time or concentrations of reactants. In deciding the temperature, the benefit of a higher coating weight or production rate due to an increased temperature must be weighed against the cost of applying heat to the bath.

The time of treatment of a metal surface with the baths of the various steps need only be long enough to ensure complete wetting of the surface and can be as long as thirty minutes. When dipping, the contact time typically ranges from about ten seconds to about five minutes. When spraying, the contact time typically ranges from about ten seconds to about three minutes. In deciding the contact time, the benefit of a higher coating weight due to an increased contact time must be weighed against the cost of the reduced throughput due to the longer contact time. It is desirable to add the organo-functional silane and borate ester in an amount to achieve a coating weight of about 1.2 to about 6.5 mg per square foot on the dried metal surface. This may be achieved in some process conditions by achieving a total weight percent of about 1.0% to about 4.0%. The phrase "total weight percent" means the total weight of the two additives as a percentage of the weight of the entire solution of the pretreating bath. Preferably, the organo-functional silane and borate ester are added in an amount to achieve a total weight percent of about 1.5% to about 3.0%. The weight ratio of organo-functional silane to borate ester can vary over a wide range, for example between about 0.01:1 to 10:1, preferably between about 0.05:1 to 1:2 and most preferably about 1:15.

Yet another water rinse step may be performed after the pretreating step, although this step is optional. The purpose of this water rinse step is to remove any pretreating solution or constituents thereof which can be easily washed off of the metal surface. This leaves a coating on the metal surface which is tightly bonded to the metal.

After the pretreating step in the event that no rinsing is done, the pretreated metal surface is dried, typically by passing the metal surface through one or more ovens in a known way. After drying, the dried metal surface is ready for the application of a decorative finish, such as a paint or lacquer. As mentioned above, it has been found that the methods and compositions of the present invention permit a relatively long time period to elapse, such as at least 8 to 12 days, between the drying of the pretreating solution and the application of a decorative finish, with little or no rust formation.

According to another embodiment of the present invention, the blend of water, an organo-functional silane, and a borate ester, as described above, is used as a final seal for a metal surface which has already been contacted with another pretreating solution. For example, in a three stage process, a metal surface is first contacted with a combined cleaning/phosphatizing bath, rinsed, then contacted with a final rinse comprising a blend of water, an organo-functional silane, and a borate ester. The combined cleaning/phosphatizing bath may include any known cleaning agent, such as an alkaline cleaner, along with a conventional iron phosphate pretreating composition and water. One such iron phosphate is sold under the trademark PHOSPLEX by Bulk Chemicals. Suitable iron phosphate pretreating compositions may include the following constituents: monosodium phosphate, phosphoric acid, or ammonium dimolybdate. The remaining two steps, rinsing and applying the blend of the present invention, are carried out similar as described above.

Alternatively, a five stage process involves cleaning, rinsing, pretreating (such as by using an iron phosphate bath as described above), rinsing, then applying a final seal by contacting the rinsed metal surface with a blend of water, an organo-functional silane, and a borate ester. All of these steps are carried out as described above.

In both of these two embodiments, the metal surface is dried and then a decorative finish is applied as described above.

EXAMPLES

The following examples are included to more clearly demonstrate the overall nature of the invention. To test a blend of organo-functional silanes with borate esters, the following experimental procedure was used:

1. Eighteen 0.020"×3.0"×6.0" steel Q-panels were cleaned in a 2.0% by volume solution of Bulk Kleen 834HP (an alkaline cleaner effective on steel substrates) at an operating temperature of 103°–135° F. for 30 seconds.

2. Each panel was rinsed in a heated (120° F.) water bath of deionized water for 20 seconds.

3. Each panel was rinsed in a room temperature (65° F.) water bath of deionized water for 20 seconds.

4. Two panels were then subjected to nine different concentrations of silane, MEA borate and silane/MEA Borate blends. The silane used was A-1100 and the MEA Borate used was Colacor RP. Each panel was immersed in a bath of deionized water containing the listed concentrations at 120° F. for 30 seconds then dried at approximately 380° F. for 40 seconds. One panel of each series was tested in a humidity chamber for 24 hours, and the second was coated with an epoxy/phenolic coating sold under the trademark EHD 0002 by Valspar for adhesion testing. The nine concentrations are as follows:

Set One—A1100 silane at 0.02% by weight
Set Two—A1100 silane at 0.04% by weight
Set Three—A1100 silane at 0.08% by weight
Set Four—MEA Borate at 0.3% by weight
Set Five—MEA Borate at 0.6% by weight
Set Six—MEA Borate at 1.2% by weight
Set Seven: A1100 silane/MEA Borate at 0.02/.3
Set Eight: A1100 silane/MEA Borate at 0.04/.6
Set Nine: A1100 silane/MEA Borate at 0.08/1.2

Panels were tested for adhesion and corrosion resistance with the results is tabulated in table 1. As is evident from the table, only the blend of the present invention resulted in a metal surface which remained rust free and passed the adhesion test.

Although illustrated and described herein with reference to certain specific embodiments and examples, the present invention is nevertheless not intended to be limited to the details shown. Rather, the claims should be read to include various modifications within the scope and range of equivalents of the claims, without departing from the spirit of the invention.

TABLE I

TEST DATA SILANE — MEA BORATE RESULTS

| % WEIGHT | A1100 Silane in DI Water | | | MEA Borate Ester in DI Water | | | A1100/MEA Borate in DI Water | | |
|---|---|---|---|---|---|---|---|---|---|
| | .02 | .04 | .08 | .3 | .6 | 1.2 | .02/0.3 | .04/0.6 | .08/1.2 |
| Adhesion 20 in/lb. | PASS | PASS | PASS | FAIL NO ADHESION | FAIL NO ADHESION | FAIL NO ADHESION | PASS NO LOSS | PASS NO LOSS | PASS NO LOSS |
| Adhesion 40 in/lb | PASS | PASS | PASS | FAIL NO ADHESION | FAIL NO ADHESION | FAIL NO ADHESION | PASS NO LOSS | PASS NO LOSS | PASS NO LOSS |
| Adhesion 60 in/lb | PASS SLIGHT LOSS | PASS SLIGHT LOSS | PASS SLIGHT LOSS | FAIL NO ADHESION | FAIL NO ADHESION | FAIL NO ADHESION | PASS SLIGHT LOSS | PASS NO LOSS | PASS SLIGHT LOSS |
| Corrosion Resistance | HEAVY RUST | HEAVY RUST | MEDIUM RUST | SLIGHT RUST | RUST FREE | RUST FREE | RUST FREE | RUST FREE | RUST FREE |

NOTE:
1. Adhesion by reverse impact measured in in./lbs. using Valspar EHD0002 epoxy phenolic lining.
2. Corrosion resistance measured by 24 hours in Humidity Chamber 100° F., 100% RH.

What is claimed:

1. A composition for use in the treatment of a metal surface comprising a blend of water, an organo-functional silane, and a borate ester comprising an amine functional group.

2. The composition in accordance with claim 1, wherein:
said organo-functional silane is selected from the group consisting of an aminopropyltriethoxy silane, a vinyl triethoxy silane, and a Bis (gamma trimethoxysilylpropyl) amine and mixtures thereof; and
said borate ester is selected from the group consisting of monoethanolamine borate and monoisopropanolamine borate and mixtures thereof.

3. The composition in accordance with claim 1, wherein said organo-functional silane and said borate ester are added in an amount to achieve a total weight percent of about 1.0% to about 4.0%.

4. The composition in accordance with claim 3, wherein said organo-functional silane and said borate ester are added in an amount to achieve a total weight percent of about 1.5% to about 3.0%.

5. A composition for use in the treatment of a metal surface comprising a blend of water, an aminopropyltriethoxy silane, and monoethanolamine borate.

6. A composition for use in the treatment of a metal surface consisting of a blend of water, an organo-functional silane, and a borate ester.

* * * * *